United States Patent [19]
Enochian

[11] 3,747,954
[45] July 24, 1973

[54] PNEUMATIC VEHICLE LADING SYSTEM MOUNTED ON SWINGABLE DOOR

[75] Inventor: Samuel H. Enochian, Thornton, Ill.
[73] Assignee: Unarco Industries, Inc., Chicago, Ill.
[22] Filed: Sept. 13, 1971
[21] Appl. No.: 179,801

[52] U.S. Cl. .................. 280/179 R, 105/369 BA
[51] Int. Cl. ............................................. B60p 7/00
[58] Field of Search .......................... 280/179 R; 105/369 BA, 369 D; 285/151, 168

[56] References Cited
UNITED STATES PATENTS

| | | | |
|---|---|---|---|
| 2,885,221 | 5/1959 | Weeks | 280/179 R |
| 3,427,997 | 2/1969 | Brown | 105/369 BA |
| 3,177,007 | 4/1965 | Oren | 280/179 R |
| 3,145,853 | 8/1964 | Langenberg | 105/369 BA |
| 2,907,580 | 10/1959 | Tietig | 280/179 R |

Primary Examiner—Benjamin Hersh
Assistant Examiner—Robert R. Song
Attorney—Lettvin and Gerstman

[57] ABSTRACT

The typical swing doors that form the rear wall of a truck-drawn trailer are provided with simple freight-engaging panels that are selectively biased against the lading by inflatable envelopes disposed between the panels and the doors. The source of gas or compressed air is communicated to the inflatable bags by means of a pivotable connector that permits the modified doors to be used as normal doors while providing a reliable supply of pressurized gas to the inflatable envelopes.

6 Claims, 6 Drawing Figures

PATENTED JUL 24 1973 3,747,954

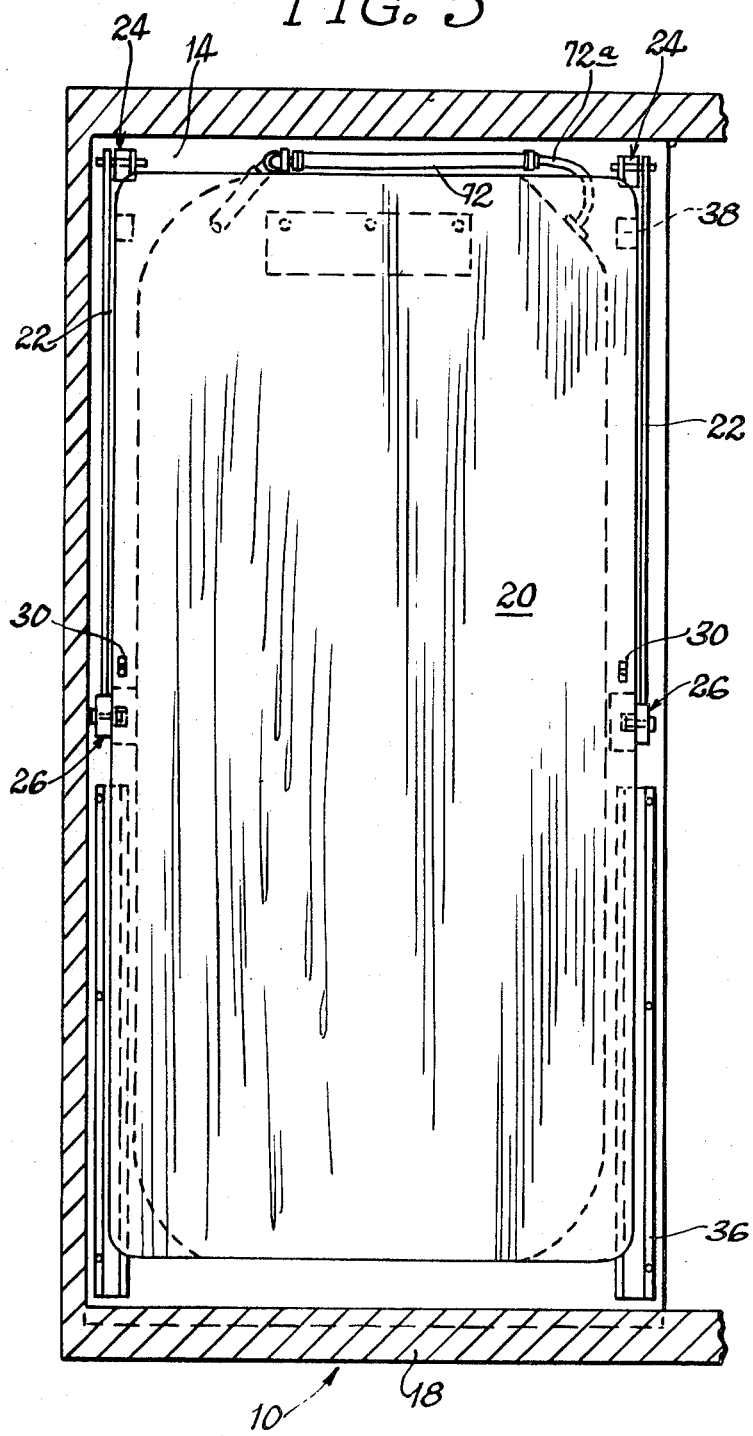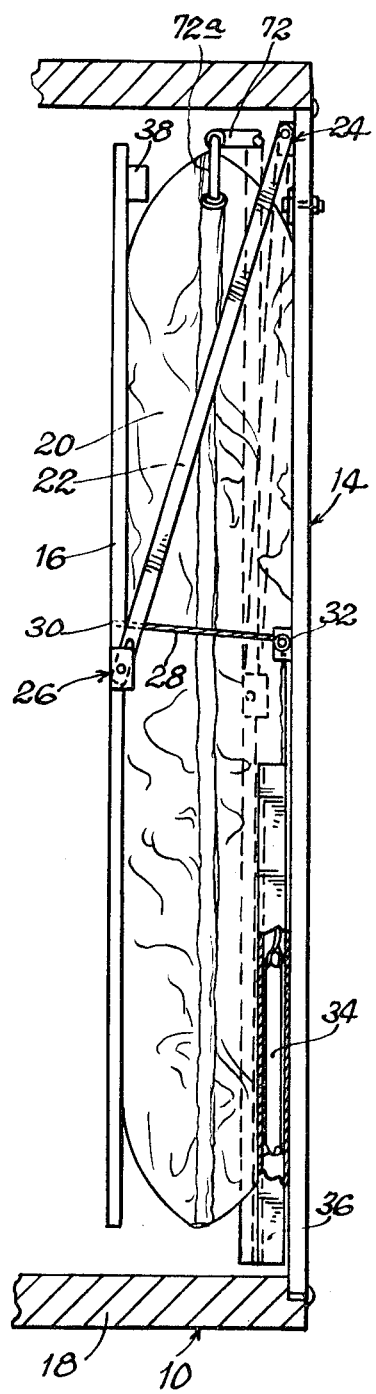

PNEUMATIC VEHICLE LADING SYSTEM MOUNTED ON SWINGABLE DOOR

BACKGROUND OF THE INVENTION

In the application of L. W. Bertram, Ser. No. 889,141, filed Dec. 30, 1969 and assigned to the assignee of the present invention, simple freight-engaging panels are provided that are to be selectively biased against the lading by inflatable envelopes disposed between the panels and a substantial upright abutment member such as a wall or a bulkhead. Some of the inflatable envelopes communicate their pressures to each other.

It is evident that when lading is carried in a typical truck-drawn trailer, the rear swing doors of the trailer serve the same function as an end wall of a railway car. It is desired to equip the door end of such a trailer with the benefits of movable lading-engageable panels that are pneumatically cushioned. It is also desired to preserve the utility of the rear swing doors which normally provide loading and unloading of the trailer. The repeated swinging of doors of a trailer between open and closed positions poses the problem of preventing obstructions to use of the door and preventing undue flexing and wear in the pneumatic lines to the inflatable cushions.

The object of the instant invention is to adapt the rear swing doors of a freight-carrying trailer with pneumatic cushioning means having selective movement for engaging and protecting lading within the trailer.

Another object of this invention is to provide pneumatic cushioning means on the rear swing doors of a trailer in a manner so as to preserve the utility of the swing doors and so as to permit the doors to swing freely wthout obstruction from the pneumatic lines and without undue wear to such pneumatic lines by the flexing that would normally accompany swinging of the doors.

Further objects and advantages of this invention will become apparent as the following description proceeds and features of novelty which characterize the invention will be pointed out with particularity in the claims annexed to and forming part of this specification.

BRIEF DESCRIPTION OF THE DRAWINGS

FIG. 5 is a fragmentary, elevational view of the inside of the rear wall of the trailer of FIG. 1, viewed from within the trailer; and FIG. 6 is a side elevational view of the structure of FIG. 5.

DETAILED DESCRIPTION OF THE ILLUSTRATIVE EMBODIMENT

Figure 1:
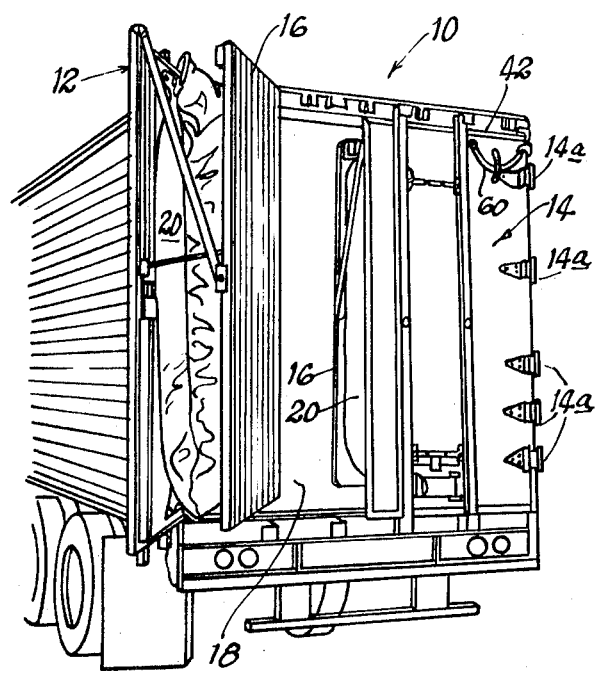
FIG. 1 is a fragmentary perspective view of the rear end of a trailer embodying my invention, showing the left-hand swing door of the trailer partially opened and the right-hand swing door closed.
Figure 2:
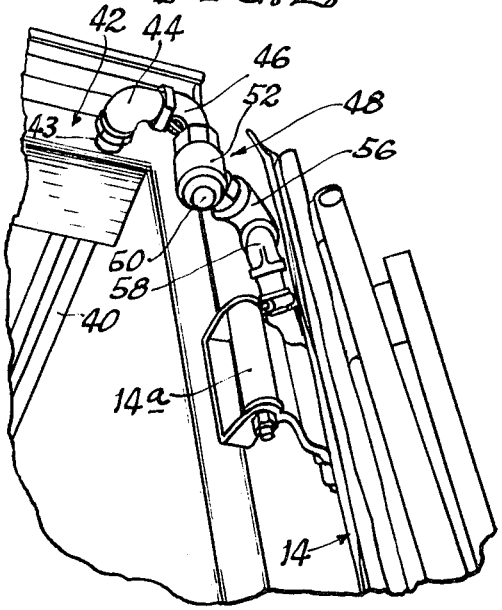
FIG. 2 is an enlarged, fragmentary perspective view of the upper right-hand corner of the rear of the trailer of FIG. 1, with the right-hand door in its open position and showing certain details of the pneumatic line adjacent the hinge of that door.
Figure 3:
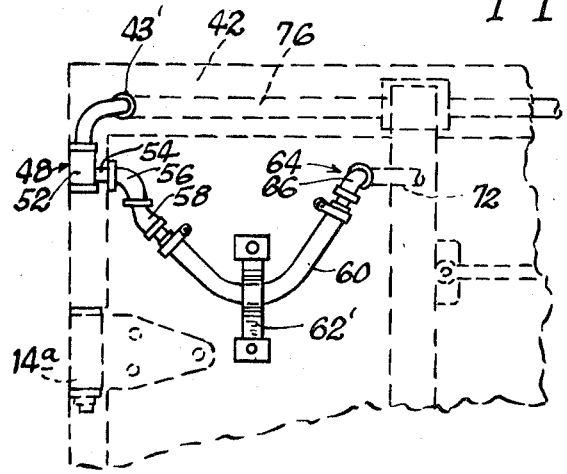
FIG. 3 is an enlarged, fragmentary elevational view of the top portion of the rear of the trailer of FIG. 1, with the two doors of the trailer shown in their closed position.
Figure 3:
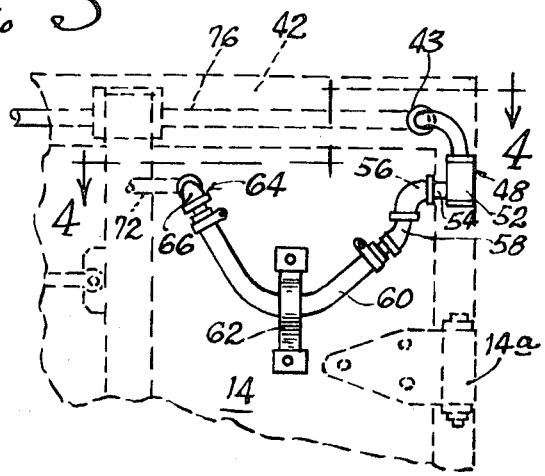
Figure 4:
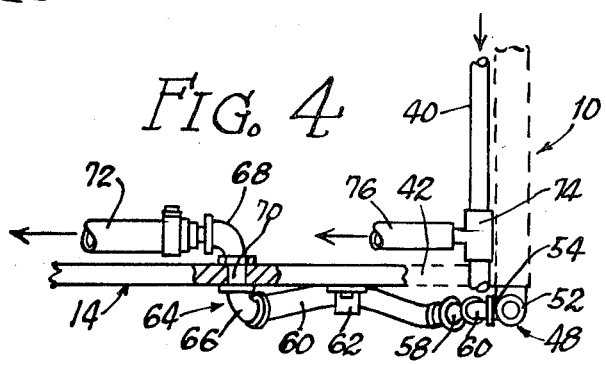
FIG. 4 is a fragmentary cross-sectional view, taken substantially on line 4—4 of FIG. 3.

Referring now to the drawings, FIG. 1 illustrates a wellknown form of truck-drawn trailer 10 having typical hinged rear doors 12 and 14, which provide access to the interior of the trailer. The improvement of this invention comprises providing means for absorbing inertia forces of the articles in trailer 10 exerted against the rear wall of the trailer. As shown in the Figures, each of the rear doors 12, 14 is provided with an associate upright article-engaging panel 16 which may be made of plywood such as one inch thick AC grade Douglas fir plywood. The panel 16 is of lesser width and height than each rear door and is spaced from its associate door. However, the size of panel 16 is effective to have its outer face engage substantially the full height and width of the articles which are stored in the trailer and rest on the floor 18 of the trailer.

Disposed between each panel 16 and each rear door is an inflatable bag 20. A type of bag which may be used is manufactured by Firestone Tire and Rubber Company and is conventionally known as a Firestone 33 inch by 89 inch inflatable dunnage bag marketed under the mark "AIR-BLOK." The sides of each inflatable bag 20 are confined between a pair of support arms 22 that connect to the spaced upright edges of panel 16. Each arm 22 is connected at its upper end by means of a pivotal connection 24 to the associate door adjacent the upper end of the door and is connected at its lower end at about mid-height of panel 16 by a pivotal connection 26.

Each panel 16 is maintained in contact with a face of an inflatable bag 20 by means of flexible cables 28 each of which connects at one end to a pin 30 on panel 16 at a point above pivot connection 26 and, after being trained over a pulley 32 carried on the trailer door, connects at its other end to a vertically disposed counterweight 34. The counterweight is confined to move in a channel 36 carried by the door 12 or 14. This arrangement normally biases the panels 16 toward the rear doors of the trailer tending to deflate the bags 20. Bumper blocks 38 project toward the doors from panels 16 adjacent the panel's upper edges, and serve to space the panels a minimum distance from the doors of the trailer so as to provide adequate storage space for the deflated bags.

Each inflatable bag 20 connects to a supply of compressed or pressurized air, or other gas, by conduit means that includes one passage through the stationary frame of the trailer, one passage through the swingable rear door of the trailer, and one swivel coupling located between the two said passages through the structure of the trailer.

The conduit means associated with the air bag 20 for each door 12 and 14 is substantially the same except for the supply conduit which leads from a source of pressurized air, or gas, to adjacent the rear of the trailer. Within the body of the trailer 10 adjacent the upper right hand edge, is positioned an elongated supply conduit, or pipe, 40 leading from a source (not shown) of pressurized air, or gas, to a point adjacent the hinged edge of the trailer's door. The source of pressure may, for example, be a storage tank for compressed air that is normally maintained charged by a compressor as is well known in the art. The supply pipe 40 at its rear end extends through and is supported by passage 43 in the upper door frame portion 42 at the right rear end of the trailer and connects through elbows 44 and 46 to a swivel connector, generally 48. The connector 48 located adjacent the hinged edge of the door includes a stationary tubular core 50 which receives gas from elbow 46 and communicates same to a pivotable sleeve 52 that surrounds core 50. Appropriate gasketing, such as O rings provide for seals between core 50 and sleeve 52 while permitting pivoting of the sleeve. The sleeve 52 carries a tubular discharge stud, or nipple, 54 through which gas passes to a right angled elbow 56 and then through a 45 degree elbow 58 to one end of a short, flexible hose 60 located on the outer side of door 14. The hose 60 is held against door 14 by a restraining strap 62 whose ends are secured, by bolts or the like, to the door 14. The other end of hose 60 connects to one end of a fitting, generally 64, that includes an upstream elbow 66 on the outside of door 14, a downstream elbow 68 on the inside of door 14 and a tubular intermediate section 70 that passes through the door 14 to be pivotally supported in the door and to, in turn, provide support for the said elbows 66 and 68. The discharge end of inside elbow 68 connects to one end of hose 72 that leads through flexible hose section 72a to the air bag 20 adjacent door 14.

To supply the compressed air, or gas, to the air bag 20 adjacent door 12, a T-fitting 74 is provided in conduit 40 adjacent the inner side of frame portion 42 and a transverse supply conduit 76 extends from T-fitting 74 substantially across the width of trailer 10 to adjacent the upper left corner of trailer 10 and thence through passage 43' in frame portion 42. Thereafter the conduit means on left hand door 12 is the mirror image of the conduit means described adjacent the right hand door 14.

The swivel connector 48 is arranged so that the pivot axis of sleeve 52 thereof is parallel to and closely adjacent, if not precisely an extension of, the pivot axis of the hinge means 14a of the door. Desirably the pivot axis of sleeve 52 lies on the same line as the axis of hinge means 14a to prevent application of substantial stress on the swivel connector 48 or hinges 14a, but if a slight offset of such axes occurs, then the flexibility of the exterior conduit means including elbows 56 and 58 and flexible hose 60, accommodates to such offset.

It will be understood that an appropriate control valve may be provided at the inlet end of conduit section 40 and when actuated to a fill position the bags 20 will be filled with suitable air pressure which may be regulated to a substantially precise pressure by appropriate air pressure controls well known in the art.

Although an illustrative embodiment of the invention has been shown and described, it is to be understood that various modifications and substitutions may be made by those skilled in the art without departing from the novel spirit and scope of the present invention.

What is claimed is:

1. In a system for safely shipping articles in a trailer having a pair of hinged rear doors, and an upright article-engaging panel in the trailer attached to and supported from each rear door, each panel serving as a member for receiving and transmitting forces that are applied longitudinally of the trailer to its respective rear door; the improvement comprising, in combination: pressurizing means within the trailer including an inflatable envelope disposed between and engaging each rear door and its respective panel, to both provide pressure means for selectively forcing the panel against the articles in the trailer and for absorbing and transmitting forces applied to the panel resulting from a tendency of the articles to shift longitudinally in the trailer; a source of gas pressure; and conduit means coupling the source of gas pressure to the inflatable envelopes, said conduit means including a supply gas line on the inside of the trailer, the rear of the trailer defining a pair of openings one of which is located adjacent the left rear door of the trailer and the other of which is located adjacent the right rear door of the trailer; a first rotatable connector positioned substantially coaxial with the left door's hinge and defining a gas flow path, a second rotatable connector positioned substantially coaxial with the right door's hinge and defining a gas flow path, a left gas line extending from the supply gas line to the left opening and therethrough to said first rotatable connector; a right gas line extending from the supply gas line through the right opening to said second rotatable connector; means connecting said left and right gas lines to their respective rotatable connectors in communication with the gas flow paths thereof; further gas lines extending from the rotatable connectors to the inflatable envelopes at the respective rear doors; and means connecting said further gas lines to their respective rotatable connectors in communication with the gas flow paths thereof, said further gas lines being rotatable with their respective connectors.

2. In a system for safely shipping articles in a trailer having a hinged rear door, and an upright article-engaging panel in the trailer attached to and supported from the rear door and arranged to move toward and away from the rear door, the panel serving as a member for receiving and transmitting forces that are applied longitudinally of the trailer to the rear door; the improvement comprising, in combination: pressurizing means within the trailer including an inflatable envelope disposed between and engaging both the rear door and the panel, to both provide pressure means for selectively forcing the panel against the articles in the trailer and for absorbing and transmitting forces applied to the panel resulting from a tendency of the articles to shift longitudinally in the trailer; a source of gas pressure; and conduit means coupling the source of gas pressure to the inflatable envelope, a rotatable connector positioned substantially coaxial with the rear door hinge and defining a gas flow path, said conduit means including a first gas line in the trailer; means connecting said first gas line to said rotatable connector in communication with said gas flow path; said conduit means further including a second gas line extending from said rotatable connector to said inflatable envelope; and means for connecting said second gas line to said rotatable connector in communication with said gas flow path, said second gas line being rotatable with the connector.

3. A system as described in claim 2, wherein said first gas line has a bend at one end to enter said rotatable connector at the connector's axis, said second gas line extending laterally from said rotatable connector.

4. A system for safely shipping articles in a trailer having a hinged rear door, said system comprising, in combination: an upright article-engaging panel in the trailer attached to and supported from the rear door and arranged to move toward and away from the rear door, the panel serving as a member for receiving and transmitting forces that are applied longitudinally of the trailer to the rear door; pressurizing means including an inflatable envelope disposed between and engaging both the rear door and the panel, to both provide pressure means for selectively forcing the panel against the articles in the trailer and for absorbing and transmitting forces applied to the panel resulting from a tendency of the articles to shift longitudinally in the trailer; means for pressurizing the inflatable envelope; and conduit means coupling the pressurizing means to the inflatable envelope, said conduit means including a gas line in the trailer connected to a rotatable connector which is substantially coaxial with the rear door hinge, and a further gas line extending from said rotatable connector to said inflatable envelope; said first mentioned gas line being located on the inside of the trailer, running longitudinally of the trailer, and extending through an opening at the rear of the trailer to said rotatable connector which is located on the outside of the trailer, said further gas line being located at least partially on the outside of the rear door and being coupled through the rear door to the inflatable envelope.

5. A pneumatically pressurized apparatus for cushioning cooperation with lading carried within a vehicle having doors that provide for access to the interior of the vehicle comprising, in combination: a hingedly mounted door having an inner side that faces the interior of the vehicle when the door is closed, a lading engaging panel operatively associated with the inner side of the door, an inflatable envelope positioned between the inner side of the door and said panel, conduit means carried by the vehicle and the door for introducing gas under pressure into the envelope to pressurize the envelope and to bias the panel in a direction toward lading within the vehicle, said conduit means including a first, fixedly mounted, supply conduit section carried by the vehicle and extending to a point adjacent the axis of the hinge of the door, a swivel connector arranged to have a pivot axis thereof substantially coaxial with the axis of the door's hinge and having one conduit portion thereof connected to the fixedly mounted conduit section, another conduit portion of the swivel connector being attached to and pivotable with the door, and a second supply conduit section fixedly mounted on the door and extending to the inflatable envelope; said second supply conduit section including one portion thereof carried on the outer side of the door and another portion thereof carried on the inner side of the door and an intermediate portion thereof extending through the door.

6. An apparatus as in claim 5 wherein the vehicle has multiple pivotable doors each with a separate inflatable bag associated therewith, and the first, fixedly mounted supply conduit section is branched to extend to points adjacent the axis of each door's hinge, and each door having a similar swivel connector, as defined in claim 5, associated therewith.

* * * * *